Jan. 2, 1951 C. M. SINNETT ET AL 2,536,892

REPRODUCER STYLUS TRACKING DEVICE

Filed Dec. 30, 1944

INVENTORS
CHESTER M. SINNETT
& HERBERT BELAR
BY
ATTORNEY

Patented Jan. 2, 1951

2,536,892

UNITED STATES PATENT OFFICE 2,536,892

REPRODUCER STYLUS TRACKING DEVICE

Chester M. Sinnett, Westmont, and Herbert Belar, Palmyra, N. J., assignors to Radio Corporation of America, a corporation of Delaware Application December 30, 1944, Serial No. 570,580

5 Claims. (Cl. 274—13)

Figures 1, 2:
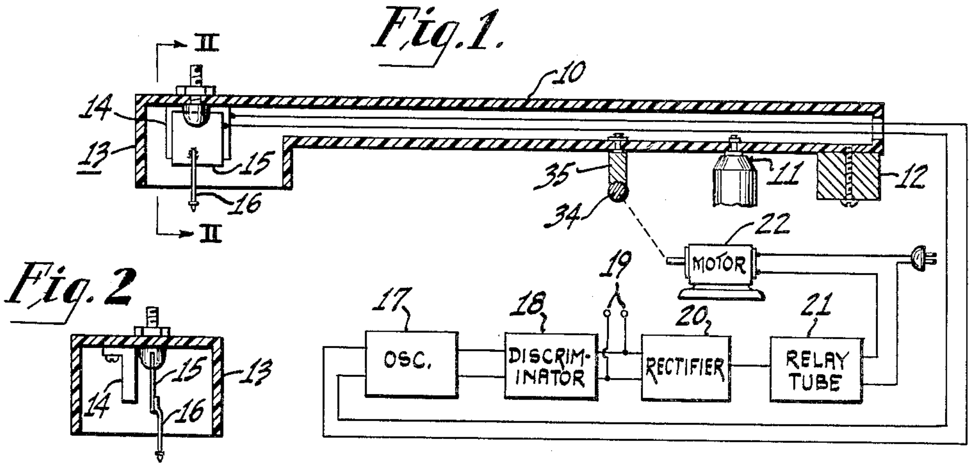

This invention relates to the reproduction of recorded sound, and has for its principal object the provision of an improved sound reproducer and method of operation which permit the use of a pickup stylus less stiff than those heretofore required and make possible greater fidelity of the reproduced sound.

The phonograph pickup devices heretofore provided have been so contructed that the pickup stylus must be stiff and strong enough (1) to support the effective weight of the tone arm and (2) to move the tone arm across the record against friction, mechanical impedance and the like. With present types of construction, these requirements have prevented the reduction of the mechanical impedance and weight of the pickup device to an extent sufficient to realize the highest degree of fidelity of the reproduced sound.

In accordance with the present invention, the required stiffness and strength of the pickup stylus is greatly reduced (1) by the provision of means independent of the stylus for moving the tone arm across the record and (2) by so constructing the pickup that the stylus functions to control or regulate the tone arm movement so that the tone arm is maintained over the groove of the record with slight pressure and friction at the stylus point.

In one practical embodiment of the invention, the pickup head has fixed to it a conductive plate, which functions as the fixed plate of a capacitor and is slightly spaced from a vibratory plate which is carried by the pickup head and functions as the movable plate of the capacitor. The pickup stylus is fixed to the movable plate and functions to change the capacity of the capacitor when the movement of the stylus across the record does not coincide with that of the tone arm. Thus movement of the stylus and plate away from the fixed plate decreases the capacity and movement of the stylus and plate toward the fixed plate increases the capacity. These changes in capacity are utilized to vary the output frequency of an oscillation generator. Through a discriminator and detector there is derived a unidirectional potential which is proportional in value to the spacing between the fixed and movable plates of the pickup. This unidirectional potential is utilized to bias a relay tube through which current is supplied to the driving motor of the tone arm so that the speed of the motor is increased when the stylus tends to lag behind the tone arm and vice versa. In this manner, the tone arm is maintained always in substantial alinement with the groove of the sound record with little pressure and friction at the stylus point.

This result may be achieved in various ways. For example, the tone arm may be driven by a spring motor and the output of the relay utilized to control a brake by which the speed of this motor is regulated in response to change in the spacing between the two plates of the pickup. Or the tone arm may be driven from the turntable motor through a clutch which is controlled by the output of the relay tube. It is apparent that in any of these cases the motor which moves the tone arm may run continuously or may be brought into action only in response to change in the position of the stylus with respect to the tone arm.

Important objects of the invention are to provide an improved pickup device which is less stiff and less heavy than those heretofore required; and to provide an improved means and method of operation for maintaining a tone arm in a predetermined relation with the groove of a sound record.

The various details of the invention will be better understood from the following description considered in connection with the accompanying drawings and its scope is indicated by the appended claims.

Figure 3:
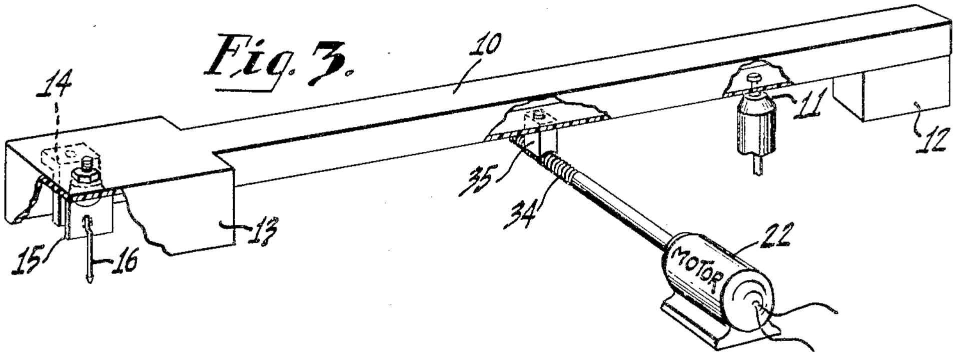
Figure 4:
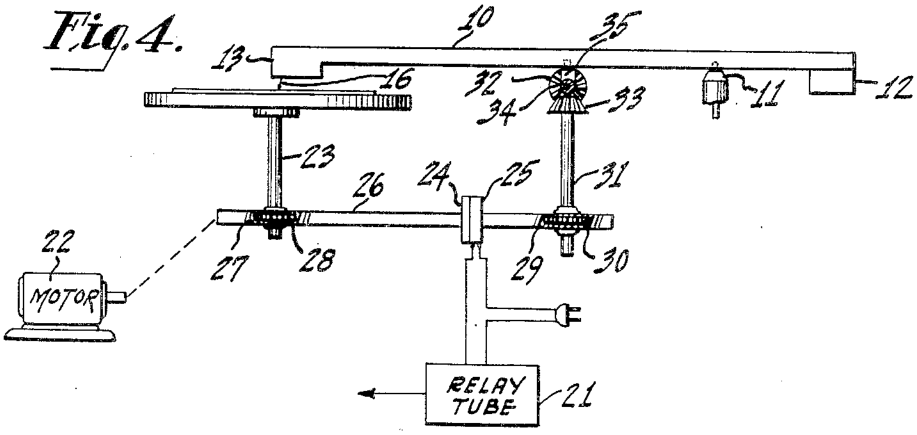

Referring to the drawings:

Figure 1 is a partly sectional and partly diagrammatic view of a preferred embodiment of the invention, Figure 2 is a sectional detail view taken on the line II—II of Fig. 1, Figure 3 is a perspective view of this embodiment of the invention showing certain features thereof in detail, and Figure 4 illustrates certain features of a modification wherein the tone arm is driven from the turntable motor.

The apparatus illustrated by Fig. 1 includes a tone arm 10 which is pivoted at 11 and is provided with a counterweight 12 at one of its ends and with a pickup head 13 at the other of its ends.

The pickup element of the illustrated apparatus includes a plate 14 which is fixed to the pickup head and a second plate 15 which is supported by and movable with respect to the pickup head and has attached to it a stylus 16.

The capacitance available at the output terminals of the capacitor formed by the plate 14 and the plate 15 is utilized in a well known manner to control the output frequency of an oscillation generator 17 which delivers its output to a discriminator 18. Various types of discriminators are too well known to require detailed illustration or description. Their normal function is well understood to be the conversion of a frequency-modulated intermediate frequency carrier into audio-frequency variations of different amplitude. Such audio frequency normally would be derived from the output terminals 19 of Fig. 1, for example. The present invention, however, has to do more particularly with the use of the discriminator output for the purpose of regulating the speed of the tone arm.

To this end, the discriminator output is supplied to a rectifier 20 which converts it to a unidirectional potential proportional in value to the spacing between the plate 14 and the plate 15. This unidirectional potential is utilized to bias the control grid potential of a relay tube 21 in such a way that the voltage of current of a tone arm drive motor 22 is increased when the tone arm tends to lag behind the stylus and vice versa. The motor 22 drives the tone arm 10 through a worm 34 on the motor shaft and a half nut 35 rotatably carried by the tone arm 10. By this regulatory action, the tone arm is maintained substantially directly above the sound record groove at all times so that the effect of mechanical impedance and tracking weight on the reproduced sound is largely avoided.

Fig. 4 illustrates a modification wherein the tone arm is driven from the turntable motor which may be of the electric or spring driven type. It will be observed that the turntable shaft 23 is coupled to a clutch 24—25 through a shaft 26 which is driven by a worm and gear 27—28 from the turntable shaft. The clutch 24—25 may be of the magnetic type, is supplied with operating current controlled by the relay 21 as previously explained, and functions through a worm and gear 29—30, a shaft 31, a pair of bevel gears 32—33, the worm 34 and the half nut 35 to move the tone arm 10 transversely of the record. Otherwise, the operation of this modification is the same as that of the device illustrated by Fig. 1.

It is apparent that suitable filter means may be interposed between the rectifier 20 and the terminals 19 for excluding from the rectifier all modulation components other than those due to the relatively low frequency component produced by the tendency of the tone arm to move ahead or behind the stylus and that other obvious modifications may be made without departing from the spirit or scope of our invention.

We claim as our invention:

1. In a device for reproducing a signal from a grooved record, the combination of a pick-up head, a stylus mounted on said head for movement over a normal range in response to contact with the groove of said record, means for moving said head, means for generating high frequency pulses, means including a capacitor having its plates mounted to move respectively with said head and with said stylus for changing the frequency of said pulses to an extent proportional to movement of said stylus without said normal range, and means responsive to said frequency change for energizing said head moving means for restoring the movement of said stylus to its normal range.

2. The combination of a phonograph pickup head, a pair of capacitor electrodes fixed to said head in spaced relationship, a stylus fixed to one of said electrodes and adapted to change said relationship, means for generating high frequency impulses, means interconnecting said generating means and said electrodes for modulating the frequency of said impulses according to change in said relationship, and means responsive to said frequency modulated impulses for reestablishing said relationship.

3. The combination of a phonograph pickup head, a pair of capacitor electrodes fixed to said head in spaced relationship, a stylus fixed to one of said electrodes and adapted to change said relationship, means for generating high frequency impulses, means interconnecting said generating means and said electrodes for modulating the frequency of said impulses according to change in said relationship, and means including a motor responsive to said frequency modulated impulses for reestablishing said relationship.

4. The combination of a phonograph pickup head, a pair of capacitor electrodes fixed to said head in spaced relationship, a stylus fixed to one of said electrodes and adapted to change said relationship, means for generating high frequency impulses, means interconnecting said generating means and said electrodes for modulating the frequency of said impulses according to change in said relationship, and means including a clutch responsive to said frequency modulated impulses for reestablishing said relationship.

5. The combination of a tone arm, a pickup head fixed to said tone arm, a pair of capacitor electrodes fixed to said head in spaced relationship, a stylus fixed to one of said electrodes and adapted to change said relationship, means connected to said electrodes for producing impulses having their frequency modulated according to change in said relationship, and means responsive to said frequency modulated impulses for moving said tone arm to reestablish said relationship.

CHESTER M. SINNETT.
HERBERT BELAR.

REFERENCES CITED

The following references are of record in the file of this patent:

UNITED STATES PATENTS

| Number | Name | Date |
|---|---|---|
| 1,780,669 | Bruckel et al. | Nov. 4, 1930 |
| 1,785,047 | Quinby | Dec. 16, 1930 |
| 2,126,910 | Moseley | Aug. 16, 1938 |
| 2,334,510 | Roberts | Nov. 16, 1943 |
| 2,400,953 | Roys | May 28, 1946 |
| 2,423,617 | Rath | July 8, 1947 |
| 2,446,390 | Rath | Aug. 3, 1948 |